United States Patent [19]

Lyles et al.

[11] Patent Number: 5,590,123
[45] Date of Patent: Dec. 31, 1996

[54] DEVICE AND METHOD FOR USE OF A RESERVATION RING TO COMPUTE CROSSBAR SET-UP PARAMETERS IN AN ATM SWITCH

[75] Inventors: Joseph B. Lyles, Mountain View; Alan G. Bell, Palo Alto, both of Calif.

[73] Assignee: Xerox Corporation, Stamford, Conn.

[21] Appl. No.: 447,673

[22] Filed: May 23, 1995

[51] Int. Cl.⁶ .............................. H04Q 11/04; H04J 3/24
[52] U.S. Cl. .......................... 370/397; 370/403; 370/414
[58] Field of Search .............................. 370/53, 54, 58.1, 370/59.2, 60, 65.5, 91, 92, 94.1, 60.1; 379/258, 268, 271, 272

[56] References Cited

U.S. PATENT DOCUMENTS

| | | | |
|---|---|---|---|
| 4,893,304 | 1/1990 | Giacopelli et al. | 370/60 |
| 5,157,654 | 10/1992 | Cisneros | 370/60 |
| 5,197,064 | 3/1993 | Chao | 370/60 |
| 5,245,603 | 9/1993 | Newman | 370/54 |
| 5,249,180 | 9/1993 | Sennema et al. | 370/60 |
| 5,267,235 | 11/1993 | Thacker | 370/60 |
| 5,305,311 | 4/1994 | Lyles | 370/60 |
| 5,319,639 | 6/1994 | Guha | 370/60 |
| 5,325,356 | 6/1994 | Lyles | 370/60 |
| 5,327,420 | 7/1994 | Lyles | 370/60 |
| 5,361,255 | 11/1994 | Diaz et al. | 370/58.1 |
| 5,367,520 | 11/1994 | Cordell | 370/60 |

OTHER PUBLICATIONS

ISSCC 90/ Wed., Feb. 1990, Continental Ballroom 1–4; "Session 2: Telecommunication Circuit" and WPM 2.4: A CMOS Batcher and Banyan Chip Set for B–ISDN by William S. Marcus, et al.

XIII Inter. Switching Symposium, May 27–Jun. 1, 1990, "Preceedings Tuesday Afternoon, May 29, 1990", vol. 3 of 6.

IEEE Trans. on Parallel and Distributed Systems, vol. 4, No. 1, 1993, "Symmetric Crossbar Arbiters for VLSI Communication Switches", by Tamir, et al.

*Primary Examiner*—Douglas W. Olms
*Assistant Examiner*—Matthew C. Phillips
*Attorney, Agent, or Firm*—Fay, Sharpe, Beall, Fagan, Minnich & McKee

[57] ABSTRACT

A crossbar switching fabric for routing data packets in an ATM switch. A logic unit associated with a reservation ring in an ATM switch intercepts data exiting a selected evaluator of the reservation ring, and processes this data to set-up a crossbar switching fabric for routing data packets of the ATM switch. The set-up data may be passed to the crossbar switching fabric upon each clock cycle thereby not incurring any pipeline processing delays. Alternatively, the set-up data is accumulated and stored in the logic unit until the completion of an arbitration session, whereafter it is sent to the crossbar. In place of the logic unit a plurality of registers may be added to each of the evaluators of the reservation ring. The registers in turn interconnected to each other in a shift register arrangement to provide the set-up data to the crossbar fabric.

20 Claims, 16 Drawing Sheets

1 < INITIALIZATION

|  | RA | SA | RC | SC | FC | T | F | CNTR | IN SESSION |
|---|---|---|---|---|---|---|---|---|---|
| PORT 0 | 3 | 3 | 0 | 0 | 0 | 0 | 0 | 0 | 1 |
| PORT 1 | 3 | 3 | 0 | 0 | 0 | 0 | 0 | 0 | 1 |
| PORT 2 | 0 | 0 | 0 | 0 | 0 | 0 | 0 | 0 | 1 |
| PORT 3 | 3 | 3 | 0 | 0 | 0 | 0 | 0 | 0 | 1 |

FIG. 3B

STEP 0 RESULT

|  | RA | SA | RC | SC | FC | T | F | CNTR | IN SESSION |
|---|---|---|---|---|---|---|---|---|---|
| PORT 0 | 3 | 3 | 0 | 0 | 0 | 1 | 0 | 0 | 1 |
| PORT 1 | 3 | 3 | 0 | 0 | 0 | 0 | 0 | 1 | 1 |
| PORT 2 | 0 | 3 | 0 | 0 | 0 | 0 | 0 | 0 | 1 |
| PORT 3 | 3 | 0 | 0 | 0 | 0 | 0 | 0 | 0 | 1 |

FIG. 3C

STEP 1 RESULT

|  | RA | SA | RC | SC | FC | T | F | CNTR | IN SESSION |
|---|---|---|---|---|---|---|---|---|---|
| PORT 0 | 3 | 0 | 0 | 0 | 0 | 1 | 0 | 0 | 1 |
| PORT 1 | 3 | 3 | 0 | 0 | 0 | 1 | 0 | 1 | 1 |
| PORT 2 | 0 | 3 | 0 | 0 | 0 | 0 | 0 | 0 | 1 |
| PORT 3 | 3 | 3 | 0 | 0 | 0 | 0 | 0 | 1 | 1 |

FIG. 3D

STEP 2 RESULT

|  | RA | SA | RC | SC | FC | T | F | CNTR | IN SESSION |
|---|---|---|---|---|---|---|---|---|---|
| PORT 0 | 3 | 3 | 0 | 0 | 0 | 1 | 0 | 0 | 1 |
| PORT 1 | 3 | 0 | 0 | 0 | 0 | 1 | 0 | 1 | 1 |
| PORT 2 | 0 | 3 | 0 | 0 | 0 | 1 | 0 | 0 | 1 |
| PORT 3 | 3 | 3 | 0 | 0 | 1 | 0 | 1 | OVERFLOW (=2) | 1 |

FIG. 3E

STEP 3 RESULT

|  | RA | SA | RC | SC | FC | T | F | CNTR | IN SESSION |
|---|---|---|---|---|---|---|---|---|---|
| PORT 0 | 3 | 3 | 0 | 0 | 0 | 1 | 0 | 0 | 1 |
| PORT 1 | 3 | 3 | 0 | 0 | 0 | 1 | 0 | 1 | 1 |
| PORT 2 | 0 | 0 | 0 | 0 | 0 | 1 | 0 | 0 | 1 |
| PORT 3 | 3 | 3 | 0 | 0 | 1 | 1 | 1 | OVERFLOW | 1 |

FIG. 3F

ARBITRATION ROUND 2

INPUT 0    REQUESTING    OUTPUT 3

INPUT 1    REQUESTING    OUTPUT 0

INPUT 2    REQUESTING    OUTPUT 0

INPUT 3   STILL REQUESTING OUTPUT 3

FIG. 3G

INITIALIZATION

|  | RA | SA | RC | SC | FC | T | F | CNTR | IN SESSION |
|---|---|---|---|---|---|---|---|---|---|
| PORT 0 | 3 | 3 | 0 | 0 | 0 | 0 | 0 | 0 | 1 |
| PORT 1 | 0 | 0 | 0 | 0 | 0 | 0 | 0 | 0 | 1 |
| PORT 2 | 0 | 0 | 0 | 0 | 0 | 0 | 0 | 0 | 1 |
| PORT 3 | 3 | 3 | 1 | 1 | 1 | 0 | 0 | 0 | 1 |

FIG. 3H

STEP 0

|  | RA | SA | RC | SC | FC | T | F | CNTR | IN SESSION |
|---|---|---|---|---|---|---|---|---|---|
| PORT 0 | 3 | 3 | 0 | 1 | 0 | 1 | 1 | 0 | 0 |
| PORT 1 | 0 | 3 | 0 | 0 | 0 | 0 | 0 | 0 | 1 |
| PORT 2 | 0 | 0 | 0 | 0 | 0 | 0 | 0 | 1 | 1 |
| PORT 3 | 3 | 0 | 1 | 0 | 0 | 0 | 0 | 0 | 1 |

FIG. 3I

STEP 1

|  | RA | SA | RC | SC | FC | T | F | CNTR | IN SESSION |
|---|---|---|---|---|---|---|---|---|---|
| PORT 0 | 3 | 0 | 0 | 0 | 0 | 1 | 1 | 0 | 0 |
| PORT 1 | 0 | 3 | 0 | 1 | 0 | 1 | 0 | 0 | 1 |
| PORT 2 | 0 | 3 | 0 | 0 | 0 | 0 | 0 | 1 | 1 |
| PORT 3 | 3 | 0 | 1 | 0 | 1 | 0 | 0 | 0 | 1 |

FIG. 3J

STEP 2

|        | RA | SA | RC | SC | FC | T | F | CNTR | IN SESSION |
|--------|----|----|----|----|----|---|---|------|------------|
| PORT 0 | 3  | 0  | 0  | 0  | 0  | 1 | 1 | 0    | 0          |
| PORT 1 | 0  | 0  | 0  | 0  | 0  | 1 | 0 | 0    | 1          |
| PORT 2 | 0  | 3  | 0  | 1  | 0  | 1 | 0 | 1    | 1          |
| PORT 3 | 3  | 3  | 1  | 0  | 1  | 0 | 0 | 0    | 1          |

FIG. 3K

|        | RA | SA | RC | SC | FC | T | F | CNTR | IN SESSION |
|--------|----|----|----|----|----|---|---|------|------------|
| PORT 0 | 3  | 3  | 0  | 0  | 0  | 1 | 1 | 0    | 0          |
| PORT 1 | 0  | 0  | 0  | 0  | 0  | 1 | 0 | 0    | 1          |
| PORT 2 | 0  | 0  | 0  | 0  | 0  | 1 | 0 | 1    | 1          |
| PORT 3 | 3  | 3  | 1  | 1  | 1  | 1 | 0 | 0    | 1          |

FIG. 3L

```
⎧  INPUT 0  (PRIORITY 1)  REQUESTING OUTPUT -
⎪  INPUT 1  (PRIORITY 2)  REQUESTING OUTPUT 3
⎨  INPUT 2  (PRIORITY 3)  REQUESTING OUTPUT 2
⎩  INPUT 3  (PRIORITY 4)  REQUESTING OUTPUT 3
```

```
-- VECTOR VC IS INITIALIZED TO ALL 0.

IF VC [SA] = SC AND T = 0 THEN

{

V [ SA, PTR [SA]] : = THE ASSOCIATED INPUT PORT;

PTR [SA] : = ( PTR [SA] + 1 ) MOD k;

} ELSE IF VC [SA] = 0 AND SC = 1 AND T = 0 THEN

-- WE HAD SC = 0 AT BOTTOM OF RING AND HAVE NOW FOUND
   AN SC = 1 CASE

{

< RESET VALIDITY OF V [SA, * ] >

V [SA, 0] : = THE ASSOCIATED INPUT PORT;

PTR [SA] : = 1;

VC [SA] : = 1;

}

AT THE END OF THE RESERVATION CYCLE, THE VALID
ENTRIES OF V MUST BE MOVED TO THE CROSSBAR.
```

FIG. 9

INITIALIZATION ARB. ROUND 1

| | VC | V*, j | PTR | |
|---|---|---|---|---|
| 0 | 0 | NV, NV | 0 | |
| 1 | 0 | NV, NV | 0 | NV = NOT VALID |
| 2 | 0 | NV, NV | 0 | |
| 3 | 0 | NV, NV | 0 | |

OUTPUT PORT

FIG. 10A

STEP 0 RESULT

| | VC | V*, j | PTR | |
|---|---|---|---|---|
| 0 | 0 | NV, NV | 0 | SA = 3 |
| 1 | 0 | NV, NV | 0 | SC = 0 |
| 2 | 0 | NV, NV | 0 | T = 0 |
| 3 | 0 | 3, NV | 1 | INPUT PORT 3 |

OUTPUT PORT

FIG. 10B

STEP 1 RESULT

| | VC | V*, j | PTR | |
|---|---|---|---|---|
| 0 | 0 | 2, NV | 1 | SA = 0 |
| 1 | 0 | NV, NV | 0 | SC = 0 |
| 2 | 0 | NV, NV | 0 | T = 0 |
| 3 | 0 | 3, NV | 1 | INPUT PORT 2 |

OUTPUT PORT

FIG. 10C

STEP 2 RESULT

OUTPUT PORT

| | VC | V*, j | PTR | |
|---|---|---|---|---|
| 0 | 0 | 2, NV | 1 | SA = 3 |
| 1 | 0 | NV, NV | 0 | SC = 0 |
| 2 | 0 | NV, NV | 0 | T = 0 |
| 3 | 0 | 3, 1 | 0 | INPUT PORT 1 |

FIG. 10D

STEP 3 RESULT

OUTPUT PORT

| | VC | V*, j | PTR | |
|---|---|---|---|---|
| 0 | 0 | 2, NV | 1 | SA = 3 |
| 1 | 0 | NV, NV | 0 | SC = 0 |
| 2 | 0 | NV, NV | 0 | T = 0 |
| 3 | 0 | 0, 1 | 1 | INPUT PORT 0 |

INPUTS 0 & 1 ARE MAPPED TO OUTPUT 3
   WITH STOPPER ID = 0 & 1 RESPECTIVELY

INPUT 2 IS MAPPED TO OUTPUT 0
   WITH THE STOPPER ID = 0

STOPPER ID IS USED TO SELECT PLANE
   IN X-BAR.

FIG. 10E

INITIALIZATION ARB. ROUND 2

OUTPUT PORT

|   | VC | V*, j  | PTR |
|---|----|--------|-----|
| 0 | 0  | NV, NV | 0   |
| 1 | 0  | NV, NV | 0   |
| 2 | 0  | NV, NV | 0   |
| 3 | 0  | NV, NV | 0   |

FIG. 10F

STEP 0 RESULT

OUTPUT PORT

|   | VC | V*, j  | PTR |
|---|----|--------|-----|
| 0 | 0  | NV, NV | 0   |
| 1 | 0  | NV, NV | 0   |
| 2 | 0  | NV, NV | 0   |
| 3 | 1  | 3, NV  | 1   |

SA = 3
SC = 1
T = 0
INPUT PORT 3

FIG. 10G

STEP 1 RESULT

OUTPUT PORT

|   | VC | V*, j  | PTR |
|---|----|--------|-----|
| 0 | 0  | 2, NV  | 1   |
| 1 | 0  | NV, NV | 0   |
| 2 | 0  | NV, NV | 0   |
| 3 | 1  | 3, NV  | 1   |

SA = 0
SC = 0
T = 0
INPUT PORT 2

FIG. 10H

STEP 2 RESULT

OUTPUT PORT

| VC | V*, j | PTR |
|---|---|---|
| 0 | 0 | 2, 1 | 0 |
| 1 | 0 | NV, NV | 0 |
| 2 | 0 | NV, NV | 0 |
| 3 | 1 | 3, NV | 1 |

SA = 0
SC = 0
T = 0
INPUT PORT 1

FIG. 10 I

STEP 3 RESULT

OUTPUT PORT

| VC | V*, j | PTR |
|---|---|---|
| 0 | 0 | 2, 1 | 0 |
| 1 | 0 | NV, NV | 0 |
| 2 | 0 | NV, NV | 0 |
| 3 | 1 | 3, NV | 1 |

SA = 3
SC = 0
T = 0

INPUTS 2 & 1 ARE MAPPED TO OUTPUT 0

INPUT 3 IS MAPPED TO OUTPUT 3

INPUT 0 WAS DENIED ACCESS
(THIS IS NOT A RELAXED ALGORITHM)

FIG. 10J

DEFINITIONS:

N = NUMBER OF INPUT AND OUTPUT PORTS.
k = NUMBER OF CROSSBARS.
I = N - STEP ITERATION NUMBER.
p = PRIORITY INPUTS (SC):
SA, SC, T ARE SIGNALS FROM THE RESERVATION RING OF THE SAME NAME.
PVC (K) [n] IS A COMPARISON FUNCTION WHICH COMPARES p WITH VC (K) [n].
CB (k) [op] = ip COMMANDS THE CROSSBAR k TO ASSOCIATE INPUT PORT ip WITH V, VC WHICH ARE INTERNAL TABLES ( ip = INPUT PORT, op = OUTPUT PORT ).

INITIALIZATION BEFORE EACH ARBITRATION CYCLE:

FOR EACH n, 0 <= n < N, FOR EACH k, 0 <= K < k

```
{
        VC (K) [n] = EMPTY;
        V (K) [n] = K;
}
```

OPERATION PERFORMED AT EACH STEP:

```
SIMULTANEOUSLY FOR EACH K, 0 <= K < k

IF T
    {
       IF PVC (K - 1) [SA] AND ~PVC (K) [SA]
       {
              CB ( V (K - 1) [SA] ) [SA] = I;
              V (K) [SA] = V ( k - 1) [SA];
              VC (K) [SA] = p;
       }
       ELSE IF ~PVC (K - 1) [SA]
       {
              V (K) [SA] = V (K - 1) [SA];
              VC (K) [SA] = VC (K - 1) [SA];
       }
       ELSE
       {
              DO NOTHING;
       }
    }
```

DEVICE AND METHOD FOR USE OF A RESERVATION RING TO COMPUTE CROSSBAR SET-UP PARAMETERS IN AN ATM SWITCH

BACKGROUND OF THE INVENTION

This invention relates generally to high-speed, broadband communication networks and, more particularly to the operation of a crossbar switching fabric suitable for communicating data packets in an ATM switch.

High-speed, broad-band communication networks include systems for routing data packets from input sources to output sources. Co-pending U.S. Ser. No. 08/340,493 (incorporated herein by reference) discloses a self routing crossbar switch suitable for use as a switching fabric in an ATM switch.

The basic architecture of prior art systems include an Asynchronous Transfer Mode (ATM), Local Area Network (LAN) using a VLSI-based "Batcher/banyan" switching fabric of the type which has been developed by AT&T/Bellcore. Batcher/banyan switching technology scales to switches larger than 256 ports, and link rates exceeding 1 gigabit/sec. These switches can be interconnected to form a large hierarchial network for supporting large user communities. An example of an actual implementation of a Batcher/banyan switching fabric exists on customized chips from Bellcore (See: *A CMOS Batcher and banyan chipset for B-ISDN*, p.g. 32–33, William S. Marcus and Jason J. Hickey, ISSCC '90, 1990, IEEE International Solid State Circuit Conference).

Ideally, a Batcher/banyan switching fabric provides parallelism whereby a single port of a Batcher sorting network can feed some number k (typically 2 or 3) banyan routing switches that are connected so that as many as k-cells can be routed to the same number of output ports during the same cell switching cycle without losing any of the data packets. This type of system is described in U.S. Pat. No. 4,893,304, entitled, Broadband Packet Switch With Combined Queuing.

In order to overcome the problem that occurs when more than one data packet is found to be destined to the same output port during the single switch cycle, a "reservation ring" is provided for fairly adjudicating the contention among such conflicting data packets, while permitting at most k of the packets to be presented to the banyan switch in any cycle. Reservation rings resolve output contentions among conflicting data packets, while implementing "fair" access to the output ports of the switching fabric.

Such Batchef/banyan switching fabrics are commonly implemented on customized chips which increases the cost of the ATM switch. Further, in a Batcher/banyan switching fabric it is possible to have multiple paths between sources and destinations which depend on other connections that are present at any particular time. Due to the dependency of one connection to another connection, diagnosing of failures is extremely difficult.

The present invention contemplates a new and improved switching fabric to replace the Batcher/banyan network of prior art systems, reducing the cost to manufacture such systems, provide easier diagnosis of failures in the fabric, simplify design, and for switches of desirable sizes, i.e. up to approximately 256 ports, provide better scaling properties than a Batcher/banyan system. The subject invention can be implemented without change to existing reservation ring mechanisms.

2

SUMMARY OF THE INVENTION

In accordance with the present invention, an ATM switch is provided having a crossbar switching fabric for routing data packets in the ATM switch. The switching fabric includes a plurality of input ports and a plurality of output ports for outputing the packets from input sources coupled to the input ports to output destinations coupled to the output ports on circuits through the fabric specified by a centralized switching scheme. A reservation ring resolves conflicts among inputs contending for access to specified ones of the outputs. A sequence of step and compare operations in the reservation ring are performed in a top-to-bottom ring-like order during at least one arbitration cycle, for granting contending inputs access to the specified outputs in top-to-bottom order. A logic unit connected to the reservation ring detects or intercepts data of input requests and uses this data to load the crossbar fabric. When an input request having a higher priority than a previously loaded input request is sensed by the logic unit, access is given to the higher priority input request.

In accordance with another aspect of the subject invention, the logic unit is configured to store sensed data and provide all inputs to the crossbar in a single operation.

In another embodiment of the subject invention, the logic unit is augmented with a plurality of added registers logically associated with but not necessarily physically located with each evaluator of the reservation ring, and connected to each other so data from the added registers are transferred to the crossbar in a pipeline fashion.

One benefit of the present invention is a switching fabric system which can be used with existing reservation ring configurations.

Another benefit of the invention is an ATM switching fabric which is simple to design with commercially available crossbar switching chips.

Still another benefit obtained by the present invention is a switching fabric which has improved scaling properties, and in which diagnosis of failures in the fabric is improved.

Other benefits and advantages of the subject invention will become apparent to those skilled in the art upon a reading and understanding of the specification.

BRIEF DESCRIPTION OF THE DRAWINGS

The invention may take physical form in certain parts and arrangements of parts, the preferred embodiments of which will be described in this specification and illustrated in the accompanying drawings which form a part hereof and wherein:

FIG. 2 schematically illustrates a reservation ring mechanism;

FIGS. 3A–3L shows the step-by-step operation of an implementation of the reservation ring in FIG. 2 that maintains a strict separation between arbitration sessions;

FIG. 9 is an algorithm used by the logic unit in a second embodiment of the subject invention;

FIGS. 10A–10J provide an illustration showing the operation of the second embodiment of FIG. 9;

DETAILED DESCRIPTION OF THE PREFERRED EMBODIMENT

While the invention is described in detail herein below with specific references to illustrated embodiments, it is to be understood that there is no intent to limit the invention to those embodiments. On the contrary, the aim is to cover all modifications, alterations and equivalents following within the spirit and scope of the invention as defined in the appended claims.

The subject invention is directed to using a crossbar switching fabric in an ATM switch implementing a reservation ring, such as a modified Cisneros reservation ring (described in greater detail below) and/or the reservation ring described in U.S. application Ser. No. 07/887,518 entitled, "Modification to a Reservation Ring Mechanism for Controlling Contention in a Broadband ISDN Fast Packet Switch Suitable for Use in a Local Area Network" which is incorporated herein by reference.

The subject invention uses a stream of requests circulating on a reservation ring such as one described above to program commercial non-self-routing crossbars such as, but not limited to, those known by the designations AMCC S2024 and LSI L64270.

Figure 1A:
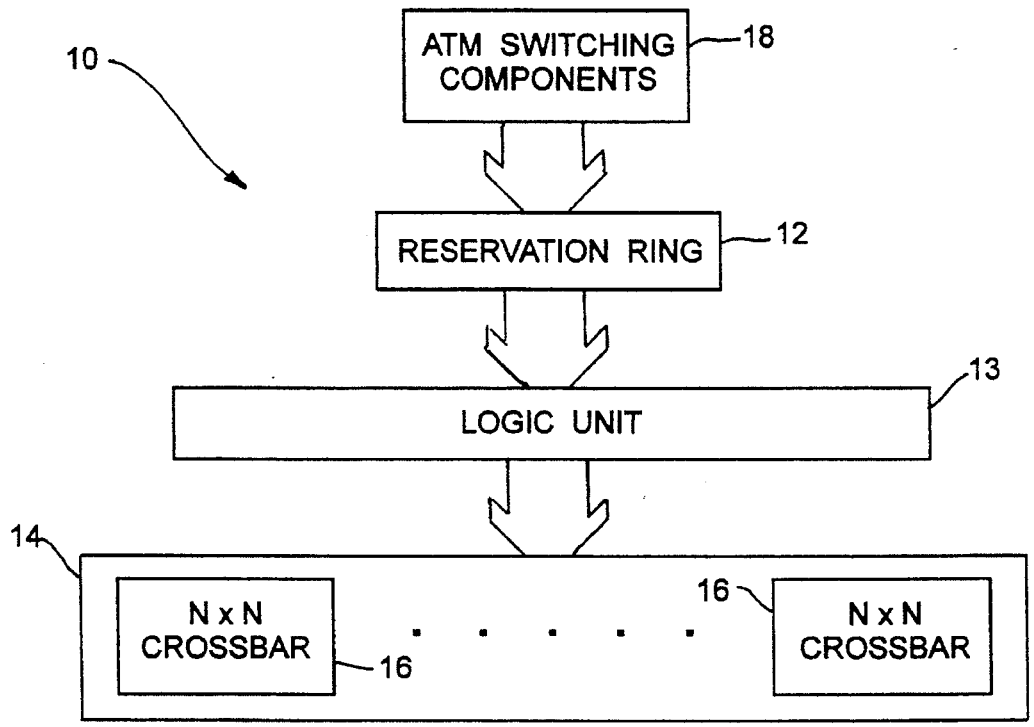
FIG. 1A is a diagrammatic illustration of an ATM switch that is constructed in accordance with this invention.

As depicted in FIG. 1A, in the ATM switch 10 of the subject invention the output of reservation ring 12 is intercepted by logic unit 13. Logic unit 13 processes this data and passes it to crossbar switching fabric 14, made up of one to a plurality of switching arrays 16, in order to set-up the switching arrays 16 for the passing of data packets.

Figure 1B:
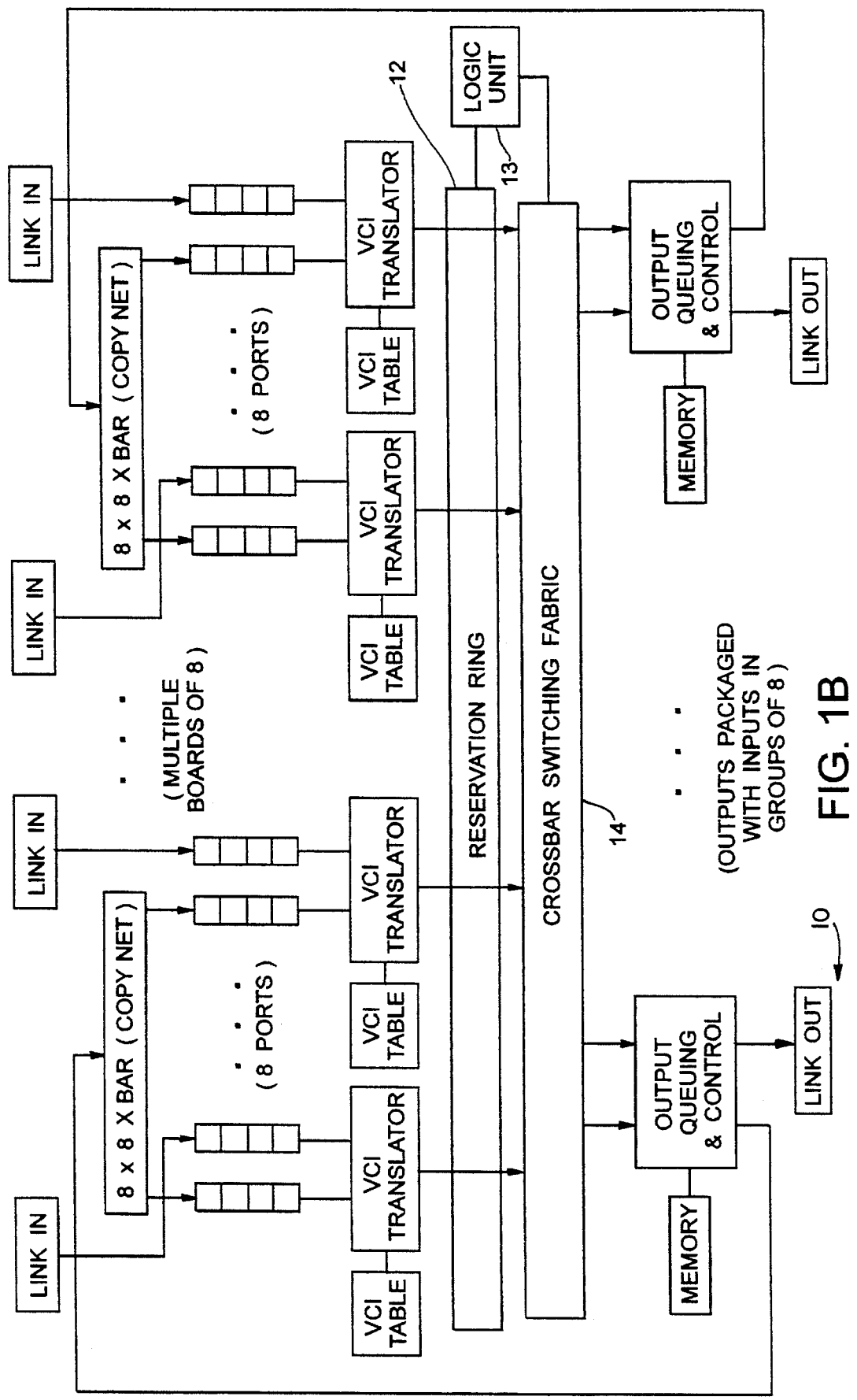
FIG. 1B is a more detailed logical illustration of an ATM switch that is constructed in accordance with this invention.

FIG. 1B provides a more detailed logical illustration of an ATM switch of the type directed to the subject invention. This figure provides greater detail regarding the elements comprising ATM switch 10. In this invention, switching fabric 14 replaces the Batcher/banyan switching fabric used in incorporated U.S. application Ser. No. 07/887,518, (this application provides a more detailed explanation of the configuration and operation of ATM switching components 18 of FIG. 1B, including VCI tables, VCI translators and copy networks). A discussion directed to operation of the elements set forth in FIG. 1B is also provided in U.S. Pat. No. 5,327,420 entitled METHOD FOR BUILDING MULTI-BIT PARALLEL BATCHER/BANYAN NETWORKS (incorporated herein by reference, see FIG. 2 therein).

A. Reservation Ring

In an ATM switch the reservation ring is the arbiter that resolves output contention while implementing "fair" access to the output ports of the switching fabric (i.e. crossbar switches), when the number of cells destined for a single output port exceeds k (where k represents the number of separate crossbar switching arrays 16). There are many different definitions of "fairness," but an arbiter that provides round-robin service for the competing input ports of the switching fabric has an attribute that is desirable.

Figures 2, 3A:
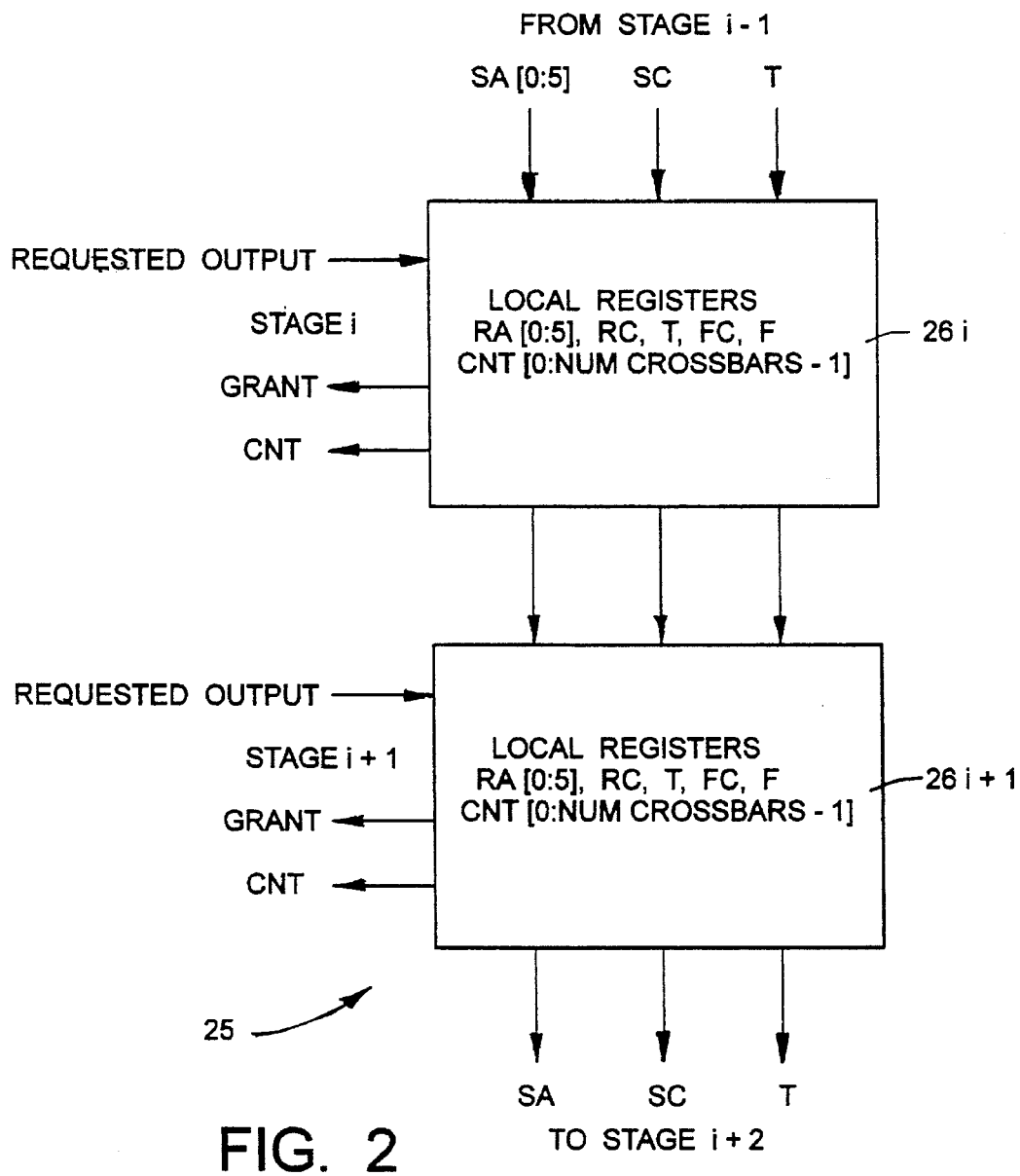

More particularly, in keeping with the teachings of a published paper of Arturo Cisneros, "Large Packet Switch and Contention Resolution Device," *Proc. XII International Switching Symposium,* Stockholm, Sweden, May/June, 1990, V3, pp. 77–83 (which is hereby incorporated by reference), and as illustrated in FIG. 2 the reservation ring is implemented as a linear systolic array 25 of finite state machines such as 26$i$–26$i$+1, which are connected to each other in a ring-like configuration. Each of these finite state machines, which are sometimes referred to hereinbelow as "evaluators", provide the data used to communicate with respective ones of the input ports of the switching fabric 14, of FIGS. 1A and 1B.

As will be seen, such a reservation ring suitably causes all cells or "packets" that are found to be destined to the same output destination during any given arbitration session to form a closed set against subsequent arrivals until all of the cells that are participating in the given session have been routed to their common output destination. This ensures that each arbitration session for each output destination is brought to an orderly conclusion before another session is initiated for that same destination, thereby providing the desired "fairness." Among the advantages of using a linear systolic array, such as array 25, are that all communications are local and electrical loads do not grow with array size. This enables linear scaling of the system.

It has been found that the Cisneros reservation ring can be modified to provide fair, single pass, round-robin resolution contention for switching fabrics, such as switch 10 having multiple switching arrays, (i.e. networks having a speed-up factor, (k≧2)).

In keeping with accepted practices, each of the finite state machines (FSMs) 26$i$–26$i$+1 function as an evaluator for determining whether the packet appearing at the head of an input queue (the HOQ packet) for a respective one of the input ports of the switching fabric 14 is addressed to the same output port (e.g., by output port number) as the HOQ packet of any of the other input ports. To this end, each of the evaluators 26$i$–26$i$+1 include a pair of address registers $RA_x$ and $SA_x$ (where x is the associated input port number).

Each of the registers $RA_x$ and $SA_x$ are initialized at the outset of each arbitration cycle to store the output port address of the HOQ packet (if any) for the associated input port. If the queue for any of the input ports happens to be empty at the outset of an arbitration cycle, the state logic for the evaluator at that port sets the bit position, $T_x$, for that port in a one bit wide contention vector to a TRUE ("1") state. Additionally, a rigorous "in session" restriction can be imposed on the arbitration process to prevent packets that arrive after the beginning of an arbitration session from joining the on-going session. Under this restriction, if a packet has been taken during a previous arbitration cycle in the session, then an InSession$_x$ flag bit may be reset to a FALSE ("0") state preventing the packet from being taken again.

The requested address RA that is loaded into the register $RA_x$ is a local variable. However, the copy, SA, of the address that is loaded into the register $SA_x$ is a propagating variable. Specifically, the SA addresses are shifted around the reservation ring 10 in top-to-bottom closed loop order under the control of a controller (not shown) for comparison in each of the other evaluators with the local requested address variable that indicates whether the associated input port is a potential participant in an arbitration session. On the other hand, the contention vector value T propagates downwardly through the evaluators to discriminate for each of the evaluators (other than the uppermost evaluator) between contenders of equal priority that are located at input ports that are located above or below the port being serviced by the evaluator in question, as well as to identify input ports that are not participating in the current arbitration session.

Up to k packets, but no more than k packets, can be switched to any given output port of the switching fabric 14 during any one switching cycle. Consequently, whenever an evaluator loses an arbitration, fairness requires that the affected packet be given priority over packets that have not yet been subject to the arbitration process. For this reason, each of the evaluators 26$i$–26$i$+1 sets a contention flag bit $FC_x$ and a pending contention flag bit $F_x$ to TRUE ("1") states whenever it loses an arbitration. The TRUE ("1") state of the contention pending flag bit $F_x$ signals the input port associated with the unsuccessful evaluator to hold the affected packet at the head of its input queue so that the on-going arbitration session can be extended for one or more additional switching cycles.

On the other hand, the contention flag bit $FC_x$ is copied into a one bit register RC for a local contention flag RC and into a one bit register $SC_x$ for a propagating contention flag SC. An evaluator participates in an arbitration session only if the local contention flag RC and the propagating contention flag SC therein are in agreement at the time the decision to participate or not is made. Thus, all contenders for any given output port are given access to an output in top-to-bottom round-robin order during the course of one or more switching cycles.

In keeping with this invention, each of the evaluators 26$i$–26$i$+1 include an integer counter $CNTR_x$ that counts through a range of k-1 from a predetermined starting value. This counter is cleared to its starting value (e.g., 0) at the outset of each arbitration cycle and then is incremented whenever its host evaluator determines that the packet at its input port is contending with a packet at a higher input port. If the evaluator receives a shifted address SA that equals its local address variable RA, the evaluator checks the state of its then current contention vector bit T and the state of its pending contention flag, F. If the evaluator has a TRUE ("1") contention vector bit T and its pending contention flag F is still FALSE ("0"), the evaluator concludes that it has won the arbitration. Accordingly, at the conclusion of the arbitration cycle, the evaluator returns a TRUE ("1"), plus the count accumulated by its $CNTR_x$ (a so-called "port counter" value), to its input buffer, thereby releasing the cell at the head of the input queue for that port for switching to the designated output port.

On the other hand, if an evaluator finds that its $CNTR_x$ has overflowed in the presence of a FALSE ("0") contention vector, T, bit value, it concludes that it has lost the arbitration round, so it sets its contention flag bit $FC_x$ and its pending contention flag bit $F_x$ to TRUE ("1") states to extend the on-going arbitration session as described above. The primary purpose of contention vector, T, bit is to distinguish top from bottom.

If desired, the InSession restrictions of the foregoing reservation ring mechanism may be relaxed to permit any valid arbitration request to participate in an arbitration session, regardless of whether it is strictly within the current session or not. The advantage of this more relaxed approach is that it reduces the number of empty switch cycles, thereby increasing the throughput of the switch.

FIGS. 3A–3L provide a step-by-step illustration of the arbitration that is performed by a reservation ring of the present type for a switching fabric having two crossbar arrays such as the fabric 14 as shown in FIG. 1A. In this simplified example, the switching fabric routes packets from four input ports, $Inport_0$–$InPort_3$, to designated ones of four output ports, $OutPort_0$–$OutPort_3$ on the basis of the output port addresses or designations that are contained by packet headers.

The reservation ring arbitrates all of the input ports of the switching fabric during each arbitration cycle to resolve any contention that occurs among packets that are addressed to the same output port in top-to-bottom, round-robin order. Multi-cycle arbitration sessions may be required to fully resolve the contention, but the contention is resolved in favor of k contending packets during each arbitration cycle, except for the last cycle of an arbitration session when the contention is resolved in favor of up to k of the contending packets (i.e., the remaining contenders). Thus, the reservation ring releases arbitrated packets into the switching fabric at the conclusion of each arbitration cycle, so each arbitration cycle is followed immediately by a switching cycle.

As illustrated in FIG. 3A, an arbitration session may be initiated with the HOQ packets for $InPort_0$, $InPort_1$, and the $InPort_3$ being addressed to $OutPort_3$ and with the HOQ packet for the $Inport_2$ being addressed to $OutPort_0$. It will be assumed that this is a new arbitration session (i.e., none of the packets are subject to an on-going arbitration session). Thus, as shown in FIG. 3B, the evaluators of the reservation ring are all initialized for the arbitration session by their state control logic. As a result of this initialization process, the evaluator for each of the input ports of the switching fabric has the address of the output port to which the HOQ packet at that particular input port is to be routed copied into its requested address register $RA_x$ and into its shifted address register $SA_x$. All of the input ports happen to be active during this arbitration session, so the InSession bit of each of the evaluators is set to a TRUE ("1") state. Furthermore, this is a new arbitration session, so each of the evaluators has its counter CNTR cleared and all of its contention related bits F, FC, RC and SC, as well as its contention vector bit T, reset to a FALSE ("0") state.

At step 0 of the arbitration process, each of the evaluators shift the address stored in its shifted address register $SA_x$ and its shifted contention flag bit SC downwardly closed loop, round-robin order into the next lower evaluator of the reservation ring. This is a closed loop shift, so the shifted address and the shifted contention flag bit of the lowermost evaluator (i.e., the evaluator for $InPort_3$) are shifted into the uppermost evaluator (i.e., the evaluator for $InPort_0$). At the same time, a TRUE ("1") contention vector bit is shifted into the uppermost evaluator, and the existing contention vector bits are shifted downwardly into the next lower neighboring evaluators in an open loop manner (i.e., the contention vector bit from the lowermost evaluator is dropped).

Following the shift operation, as shown in FIG. 3C, each of the evaluators compares the address in its requested address register $RA_x$ with the address in its shifted address register $SA_x$ for equality. If the evaluator determines that those two addresses are different, it takes no further action (see the states of the evaluators for $InPort_2$ & $InPort_3$). On the other hand, if an evaluator determines that its requested address and the address that has been shifted into it are the same, it concludes that the packet at its input port may be contending with a packet at another input port.

Thus, to confirm that there is actual contention among those packets, the evaluator compares the states of its requested contention bit RC and shifted contention bit SC for equality. If those two bits have the same state (both FALSE ("0") or both TRUE ("1")), the evaluator checks the state of its contention vector bit T to determine whether the contending packet is at an input port above or below the input port the evaluator is servicing. If the contender is at a lower input port (contention vector bit in a TRUE ("1") state), no immediate action is required of the evaluator (see the state of the evaluator for $InPort_0$). If, on the other hand, the evaluator concludes that the contender is at a higher input port (contention vector bit still in a FALSE ("0") state), the evaluator increments its counter CNTR to account for the fact that the contention has been resolved in favor of the contender (see the states of the evaluator for $InPort_1$).

As illustrated by FIGS. 3C–3E, the step and compare process is repeated at least N-1 times (where N is the number of input ports) for each arbitration cycle. If the counter CNTR of any of the evaluators overflows during any step of the process, the pending contention flag bit F for that evaluator is set to a TRUE ("1") state, thereby also setting the contention flag bit FC of the evaluator to a TRUE ("1") state (see the state of the evaluator for $InPort_3$ at step 2 as shown in FIG. 3E.

If desired, as shown in FIG. 3F, an additional step operation may be performed to signal the conclusion of the arbitration cycle. Upon the conclusion of the arbitration cycle, when a TRUE ("1") state exists, the evaluators are able to grant signals to their respective input ports if their pending contention bit F is still FALSE. Any input port that receives such a grant can release its HOQ packet into the switching fabric for routing to the designated output port. As will be seen, each of the evaluators also returns its pending contention bit F to its associated input port. Thus, if an input port concurrently receives a FALSE ("0") grant and a TRUE ("1") pending state bit, the input port holds its current HOQ packet for the next arbitration cycle.

As illustrated in FIGS. 3G–3L, the second and subsequent arbitration cycles of an arbitration session are similar to the first. That is, the requested addresses and the requested contention flag bits that are stored within the evaluators provide a two dimensional array of address and contention state data against which the address and state data that is provided by the circulating shifted addresses and shifted contention flag bits are compared for equality of every pairing of the input ports. However, whenever an additional arbitration cycle is required to complete an arbitration session, the contention flag bit FC is set to a TRUE ("1") state prior to the completion of the prior arbitration cycle in any evaluator that has its counter CNTR overflow (see FIG. 3E). This flag bit FC, in turn, is copied into the requested contention bit RC and the shifted contention bit SC of that evaluator during its initialization for the next arbitration cycle (see FIG. 3H), thereby ensuring that any resolved contention continues to be resolved in top-to-bottom, round-robin order during the subsequent cycle or cycles of the arbitration session.

An evaluator that finds equality to exist between its requested address and an address that is shifted into it, resets its InSession bit to a FALSE ("0") state if it finds that the shifted address is accompanied by a TRUE ("1") shifted contention flag bit SC and that its own requested contention flag bit RC is false.

B. An Alternative Arbitration Process

Another systolic array approach to providing "fair" access to the output ports, is described and claimed in United States patent application of Joseph B. Lyles, which was filed May 20, 1992 having Ser. No. 07/887,164, this application has been incorporated herein by reference.

C. The Crossbar Switching Fabric/Logic Unit

Figures 4A, 4B:
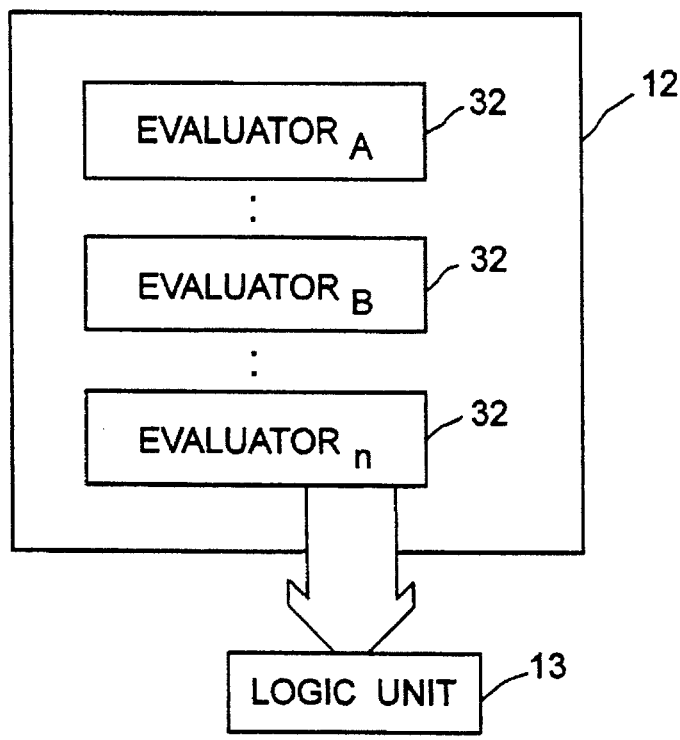
FIG. 4A illustrates the operational connection between the last evaluator of the reservation ring and a logic unit which sets-up the crossbar fabric.
FIG. 4B provides a chart associating prioritized input ports and requested output ports.

In ATM switches implementing a Batcher/banyan switching fabric there is no centralized point at which control is maintained. Rather, switching is localized in the distributed nodes of the fabric. As illustrated in FIG. 4A, the subject invention provides logic unit 13 operatively connected to the last evaluator 32 at the bottom of reservation ring 12, to intercept, examine and process signals (such as those discussed in connection with FIGS. 3A–3L) coming out of the last evaluator of reservation ring 12. It is to be appreciated that while the following discussion operatively connects the logic unit 13 to the last evaluator of the reservation ring 12, the logic unit 13 may be operatively connected at a position other than the last evaluator.

For purposes of initial explanation of the subject invention, it is first assumed the subject ATM switch is working with a k factor of 1, all requests are valid and there is no ongoing arbitration session. In this situation logic unit 13 will detect a request from input port N-1 then a request from input port N-2, . . . , through a request from input port 0. Under these assumptions, it is thereafter straightforward to compute a mapping between output ports and the input port which drives logic unit 13. Particularly, an output port i (not shown) is connected to input port j (not shown) if input port j was the last input port to request output port i.

Such a scheme is implemented by having the logic unit 13 at the bottom of the reservation ring maintain a vector (not shown) indexed by output port number. The contents of each vector element is the input port which is mapped to that output port. The vector is initialized to values denoting "no connection." Then, in the absence of any arbitration sessions or priority indications, the last value (i.e. input port 0) will be the valid value since access is granted in a top-to-bottom arrangement.

As an alternative to the above example, a table is configured to replace the vector. This table is internal to logic unit 13 and stores data including the requested output port, and validity and priority of the requesting input port. The priority may be a single priority bit or may in fact be a priority function which provides more detailed information. For example, the priority information being rotated on the reservation ring may be configured to be an absolute type priority which overrides all other type of information.

The general operation of the subject invention is now discussed in connection with an arrangement where k=1. In this example there are 4 input ports (input port 0–input port 3, 4 output ports (output port 0–output port 3) and there is an input port priority from a lowest priority (i.e. 4) for input port 3 to a highest priority (i.e. 1) for input port 0 (see FIG. 4B). This discussion assumes that each input port making a request has a valid request. Therefore, there will not be a need for further discussion of whether or not the valid bit has been set.

Logic unit 13 first senses a request of input port 3 for output port 3. This request is copied into an internal table, is processed by logic within the logic unit, and is substantially simultaneously sent off to the crossbar. When the next port, input port 2, is cycled to the bottom of reservation ring 12, logic unit 13 detects a request for input port 2 to be connected to output port 2. This request is stored in the table of logic unit 13 as well as being sent to the crossbar. Next, input port 1 is rotated to the bottom of the reservation ring 12 and is detected to also be requesting output port 3. At this point logic unit 13 will determine that it has already sent a request for output port 3 to the crossbar set-up.

The logic unit must now determine whether it is necessary to update the crossbar setting with a new setting (i.e. incoming request of input port 1) or to leave the crossbar as it is now set. To accomplish this, the logic unit compares the priority of input port 3 which is contained in the internal table with the priority of input port 1 which is received on the lines of the reservation ring. If the request coming in on the lines of the reservation ring has a lower priority, the crossbar configuration is maintained and nothing is reloaded into the crossbar. If the input port 1 request is found to have a higher priority than input port 3, the crossbar is reloaded, and it is necessary to update the internal table of logic unit 13.

In order for this operation to be successful it is necessary for logic unit 13, which is testing and comparing the requests, to have identical priority functions to those of reservation ring 12, as for example the priorities discussed in connection with FIGS. 3A–3L.

The loading of the logic table occurs during every clock cycle. During each clock cycle a new set of data is rotated through to the bottom of the reservation ring, i.e. to the last evaluator. Therefore, in a system having 32 ports it would be necessary to have 32 clock cycles to allow each data element to loop through reservation ring 12. These 32 clock cycles comprise an arbitration cycle.

In the above example, the priority value such as the SC priority will be cycled through and stored in the internal table of logic unit 13 to be used in the priority comparison.

During the arbitration cycle, the evaluator for input port 3 obtains information regarding input port 1 and performs a priority comparison. The evaluator for input port 3 determines that input port 1 and 3 are set to transfer data to the same address (i.e. output port 3). It is then determined that input port 3 has a higher priority then input port 1. Likewise, during a different clock cycle, the evaluator for input port 1 will obtain information for input port 3 and will determine that input port 1 has a lower priority. Therefore, the evaluator of input port 1, the evaluator of input port 3 and logic unit 13 use the same priority information and the same priority function in obtaining the same results.

Thus, evaluators 32 will be undertaking the same comparisons that are occurring at the bottom of reservation ring 12 by logic unit 13. However, it is likely these comparisons will be done at different times since the information is being rotated through the reservation ring and will therefore be evaluated at different times.

This invention recognizes that it is possible to use logic unit 13 to "pick-off" information regarding the desired outputs from the reservation ring 12.

As will be discussed in greater detail below, the invention further recognizes the possibility of setting the crossbar switching fabric on each clock cycle. This can be achieved since it has been recognized that there are time slots available so that even if premature or incorrect information is sent to a crossbar there are sufficient clock cycles to correct this information. Such operation assumes that the crossbar is in a sense a double buffered device so that by the end of an arbitration cycle all incorrect crossbar set-ups will have been corrected. Having a double buffered device allows the crossbar to perform routing at the same time it is being set-up, making it is possible to overwrite entries in the crossbar without affecting other operations.

It is to be appreciated that while the proceeding discussion has been directed to a situation where K=1 the invention can be implemented such that the crossbar fabric contains multiple crossbar arrays, i.e. where k≧2. In such a situation logic unit 13 includes a plurality of tables to control proper loading of the crossbar fabric.

Embodiment A

Figure 5:
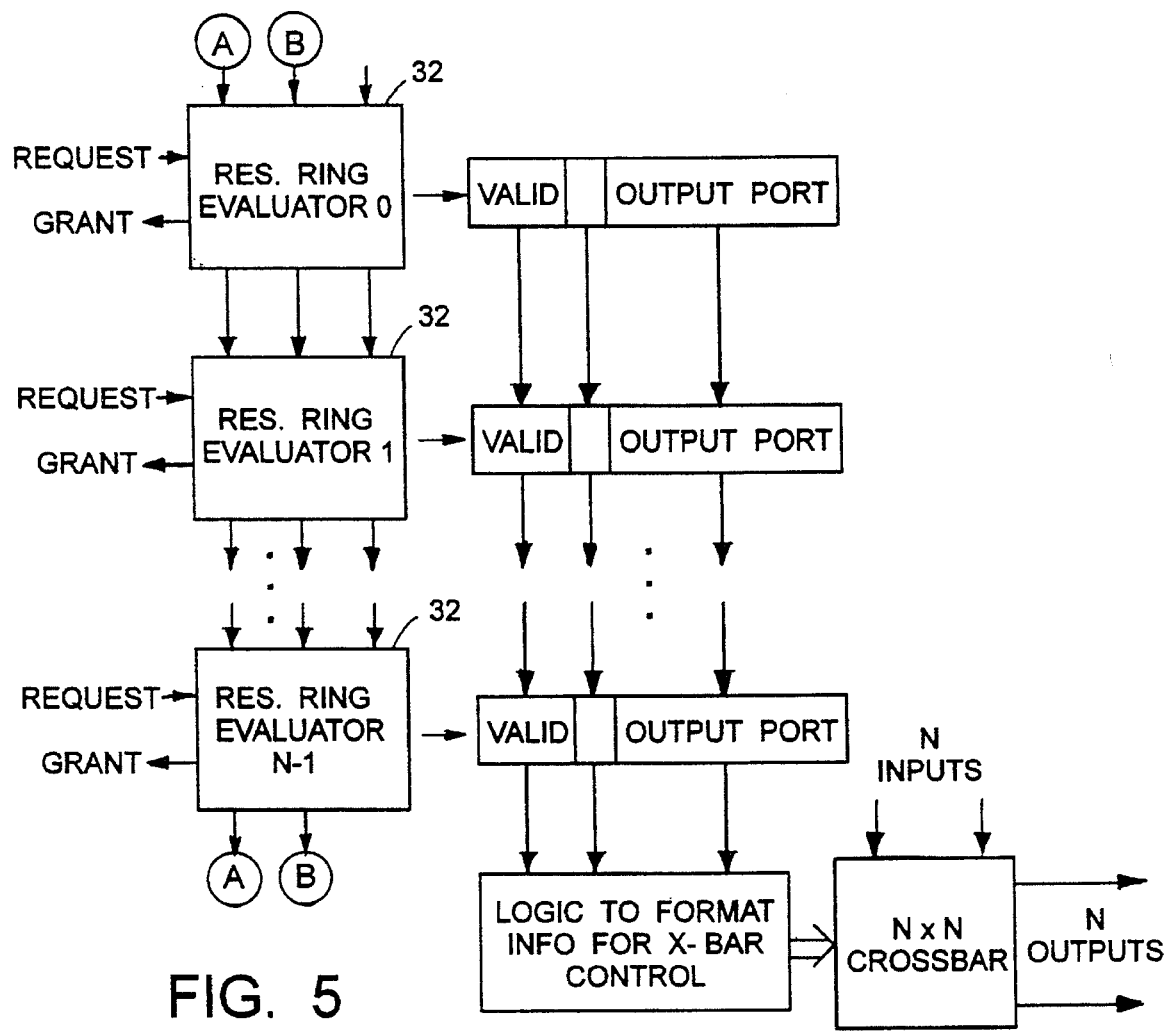
FIG. 5 provides a first embodiment which augments the logic unit located at the bottom of a reservation ring with additional registers provided for each evaluator of the reservation ring.

Embodiment A of the subject invention is depicted in FIG. 5. This embodiment takes advantage, as will the succeeding embodiments, of the fact that reservation ring 12 shifts requests around the ring in a top-to-bottom sequence. The architecture of the reservation ring is altered to include, in addition to the reservation ring hardware, additional hardware registers connected with each evaluator so that the register contents are shifted from a top port (such as input port 0 of FIGS. 3A–3L) to the bottom of the reservation ring. Each evaluator 32 is extended by the addition of three registers, including a one-bit register, "Valid", a $\log_2 k$ bit register, "Z", and a $\log_2 N$ bit register, "OutputPort."

At the end of an arbitration cycle the Valid register contains an indication of whether the evaluator has won or lost/was inactive, the Z register contains a copy of a variable Cntr or stopper ID, and the OutputPort register contains the address of the output port to which the input port won access. All the evaluators have their Valid registers tied together in a shift register, their Z registers tied together in a shift register and their OutputPort registers likewise tied together in a shift register. While the next arbitration session is ongoing the results of the current session are then shifted out to the switching fabric.

Figure 6:
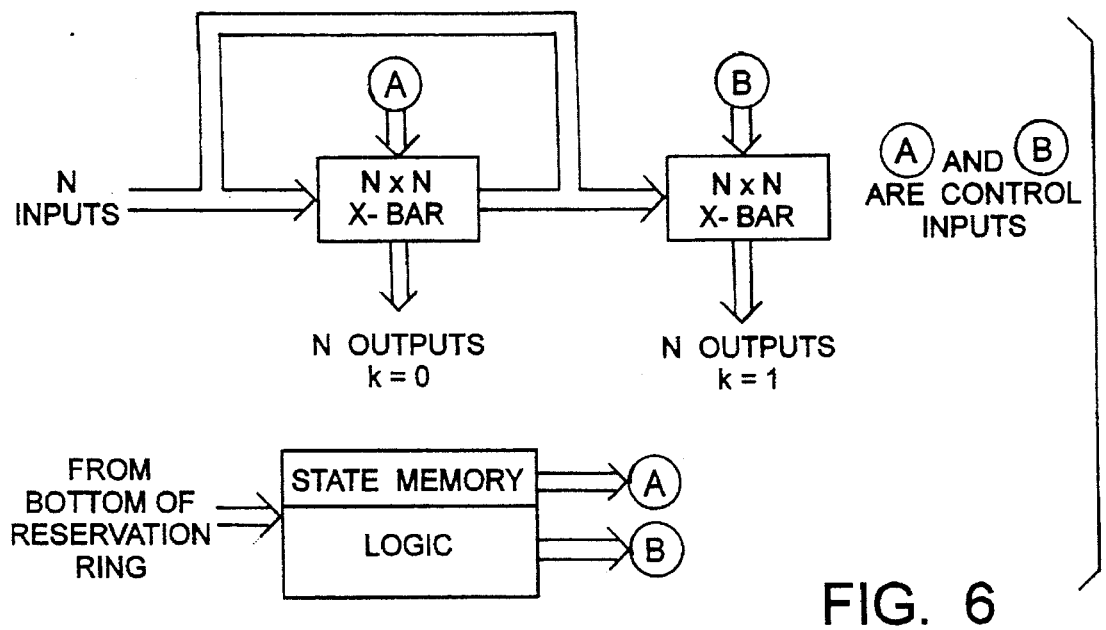
FIG. 6 illustrates a switching arrangement where "Valid", "Z", and "OutputPort" registers are shifted through a control chip.

Many crossbar chips such as AMCC S2024 and LSI L64270 have an internal pipeline stage between control inputs and the crossbar array. A sequence of control inputs can be input and buffered in the pipeline stage then written to the crossbars in a single clock. For chips such as the AMCC S2024 which have a reset line associated with the pipeline stage, the sequence of actions associated with setting up a crossbar fabric for routing the next set of cells would be to reset the pipeline stage so that all outputs are "not connected," then shift the Valid, Z and OutputPort registers through a control chip as shown in FIG. 6. This chip uses Valid$i$ to decide if the entry is valid, $Z_i$ to decide which crossbar to write, an OutputPort$_i$ to address the output port.

The input port being routed to the output port is determined implicitly by the position in the reservation ring (thus requiring a counter), or explicitly by adding another vector input number$_i$, each entry of which is initialized to the appropriate input port number, to the ring.

Figure 7:
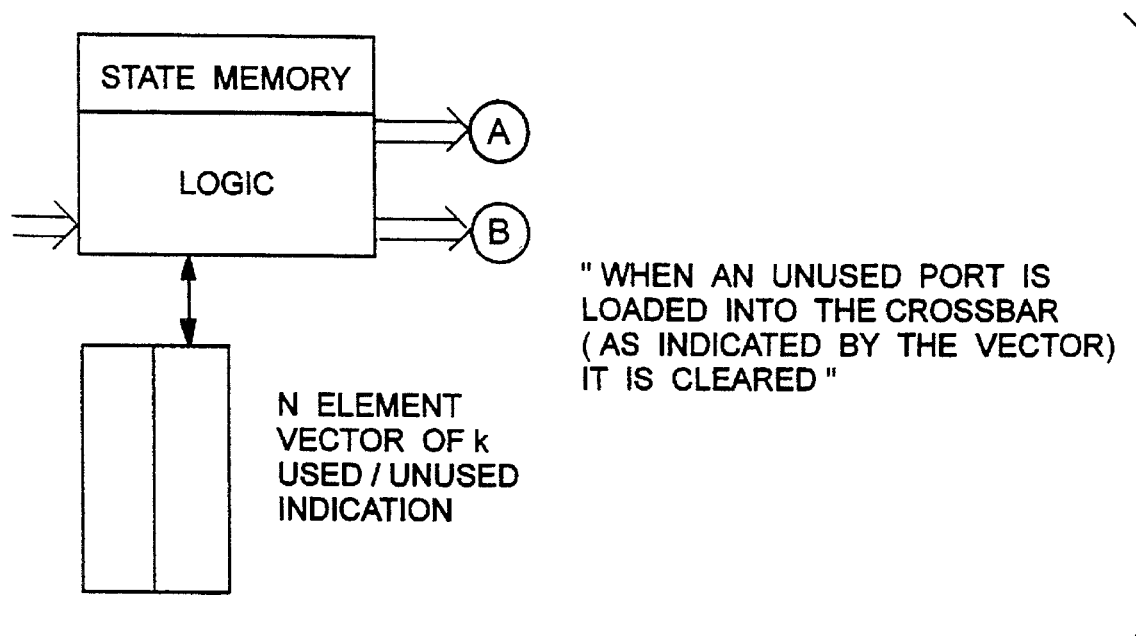
FIG. 7 illustrates a switching arrangement for crossbars which do not have the capability of resetting a pipeline stage in an embodiment as shown in FIG. 5.
Figure 8:
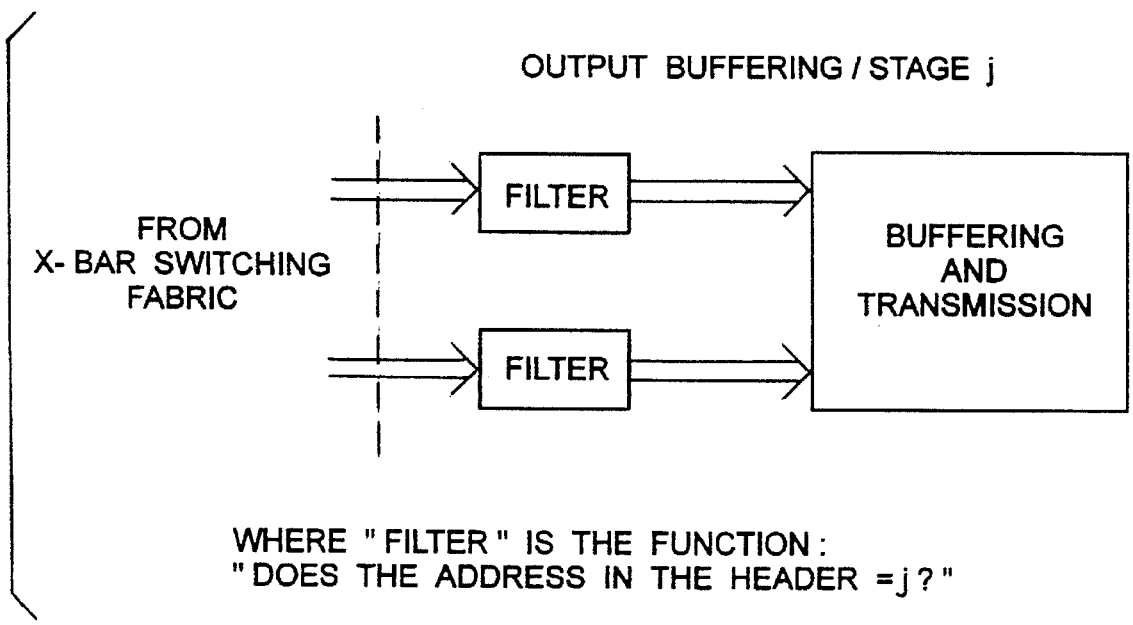
FIG. 8 illustrates a switching arrangement with a crossbar which does not have the capability of resetting the pipeline stage and provides a filtering out of packets not addressed to a particular crossbar.

For crossbars which do not have the capability of resetting the pipeline stage, either an external pipeline stage must foe provided to allow unused outputs to be reset to "not connected" as in FIG. 7 or the switch output buffers must be capable of filtering out packets not addressed to them for example as shown in FIG. 8. Alternatively, twice as many banks can be used and they can be alternately set and cleared. These concepts are relevant to all the embodiments of the subject invention.

Embodiment B

Embodiment B uses the logic unit 13 located at the bottom of the reservation ring to detect and copy signals coming out of the bottom of reservation ring 12, immediately prior to the signals being recirculated back to the top of the reservation ring. A difference between the second embodiment of the subject invention and the first embodiment is that, the second embodiment does not require the addition and interconnection of registers Valid, Z, and OutputPort. In place of the registers of the first embodiment, an algorithm such as shown in FIG. 9 functions to load the crossbar switching fabric. Use of this algorithm reduces the cost of implementing the subject invention and increases through-put of the system.

In the second embodiment, data which is to be sent to the crossbars is mapped into memory, i.e. tables inside of logic unit 13. These tables are configured by methods that are well-known to those skilled in the art. Logic unit 13 has a table Vij, where $0 \leq i \leq N-1$ and $0 \leq j \leq k-1$. The entries of the $V_i$, table are written circularly, i.e. j=0, 1, 2 ... k-1, 0, 1, 2, ... Also defined in the algorithm of FIG. 9 is a vector $PTR_i$ which contains a pointer to the last entry written for any row of $V_{i*}$.

Embodiment B may also include a feature of using a "stopper ID" bit for trunk grouping where it is desirable to maintain the order of the cells. The "stopper ID" bit, which can take up to K unique values, is appended to the output port address in a switch header for each input cell before the cell is routed through the switching fabric. For trunk grouping situations, the stopper ID is used at the receiving stage to distinguish which packet has a higher priority.

As will be appreciated, there can be at most k cells routed to any given output port address per switch cycle, so the stopper ID suitably is an integer that takes on K unique values. Advantageously, the stopper ID is computed by the reservation ring.

In the algorithm of FIG. 9 the use of SC, RC, T and the other terminology have meanings equivalent as when used in connection with FIGS. 3A–3L. Therefore, SC is a propagating contention flag, RC is a local contention flag, and T is a contention vector bit. A test is made to find whether one of SC and RC is equal to 1 and the other equal to 0, whether both are equal to 1, or both equal to 0. By doing this it can be determined whether the ports represented by the respective SC and RC are in the same arbitration session.

A feature of this embodiment is the accumulating of mappings of inputs to outputs and storing these mappings in tables within logic unit 13. Mappings are accumulated for both what is presently being detected and the status of the last information which was accumulated. To do this, data is sampled from the bottom of reservation ring 12 and stored. Then, the next occasion there is a mapping between an input port requesting the previously stored output port, logic unit 13 tests to determine if the stored information and the presently sensed information are in the same session. If they are not in the same session the requesting port is ignored. If the requesting port is active and the stored port is inactive or at a lower priority, then the mapping is rewritten to replace the previous input port to output port mapping with the new input port to output port mapping.

We will now consider the case where there is an ongoing arbitration session. In this situation, there is some number of evaluators (recalling that there is one per port) which entered the current arbitration with the state variable FC set. This entry will cause variables SC and RC to be set. Recalling that the input ports are served in a top-to-bottom round robin sequence, then if an input $port_i$ is out of a given session for some i, then all input ports less than i must be out of that given session. Thus, if another vector $VC_i$ is introduced, and it is used to store the SC value associated with a given request for an output port, then the algorithm of FIG. 9 functions before replacing an entry in table V and its associated entry in VC.

At the end of an arbitration session, all valid entries which have been stored in the memory of table V will then be moved to the crossbar. By having a separate table which is copied into the crossbar, a full arbitration cycle delay is added which introduces a pipeline delay and in turn increases the buffering requirements of the system.

FIGS. 10A–10J illustrate the operation of this embodiment, with the left-hand side of the figures representing four (4) output ports (output port 0–output port 3), and the states of VC, $V_{*j}$ and Ptr. The designation NV indicates a "Not Valid" state. Two arbitration rounds are illustrated. In arbitration round 1 input ports 0 and 1 are mapped to output port 3 with the stopper ID equal to 0 and 1 respectively. Input port 2 is mapped to output port 0 with the Stopper ID equal to 0. In the second arbitration round input port 2 and 1 are mapped to output port 0. Input port 3 is mapped to output port 3 and input port 0 is denied access. It is to be appreciated that this example is not for a relaxed arbitration situation.

The algorithm of FIG. 9 will not handle the relaxed definition of an InSession restriction of the Cisneros reservation ring. In order to handle such a case, vector VC must be turned into a table and the situation where several SC=0 values are found above some number SC=is needs to be addressed.

Embodiment C

In embodiment C, logic unit 13 loads the crossbar simultaneously as the information from reservation ring 12 is shifted out of the last input controller (i.e. evaluator).

In the third embodiment the crossbars are being set on an ongoing basis as data is shifted out of the reservation ring. In other words, the states of the requests by the input ports are being copied into the crossbar at the same time they are being copied into internal tables of the logic unit and, therefore, there is no need to recopy the data sent to the crossbars. This results in a system operating at a higher speed and lower latency than a system implementing the second embodiment.

Figure 11:
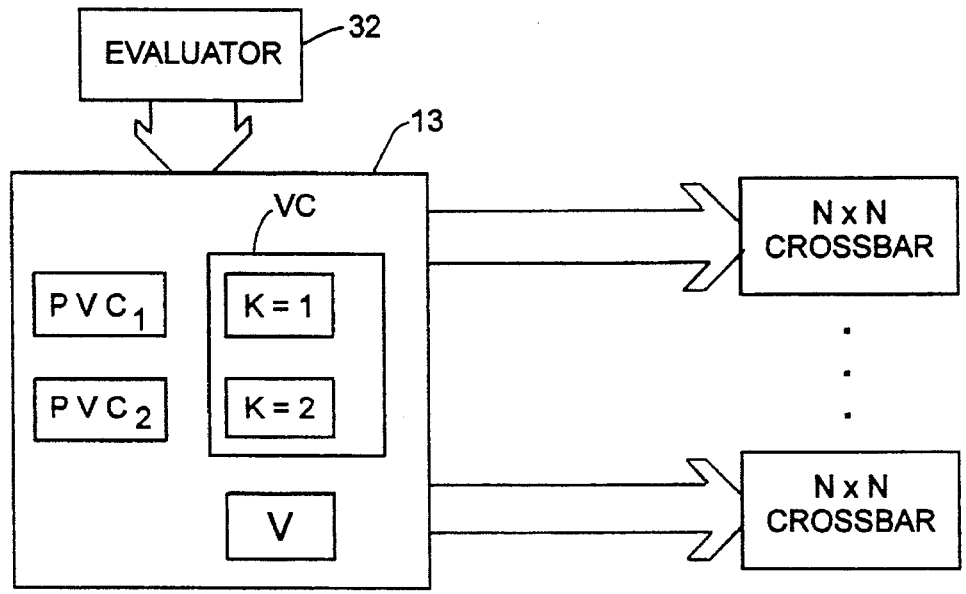
FIG. 11 is a more detailed illustration of the logic unit, used in the description of a third embodiment; and, FIG. 12 is an algorithm used by the logic unit in the third embodiment, wherein there is no cell delay in loading the crossbar fabric.

The number of banks is denoted by k. The number of input and output controller ports are equal and are denoted by N. The logic unit uses two sets of tables, both tables have k banks and N entries per bank. In this description they are denoted as TABLE(K) [n] where K is the bank and n is the entry, with $0 \leq K < k$ and $0 \leq n < N$. The n index is the output port that is being requested, and the K index is the packet or cell being processed. As illustrated in FIG. 11, a first class of tables, VC, store priority inputs. A second class of tables, V, store the crossbar associated with the input controller port number. It is to be appreciated that while in this embodiment the number of input and output controller ports are equal, this embodiment may of course be extended to cases where the input and output controller ports are unequal.

The crossbars in the system are loaded by CB(K)[l]=n, where K is the crossbar bank, 1 is the input port and n is the output port. This causes the crossbar bank K to route from input port l to output port n. This embodiment only stores the input no output mapping in the crossbars.

Associated with each bank of VC tables, is a comparison function, PVC (K) [n], that compares the current contents of table VC(K) [n] with the pending input p, which is an input to the priority function and consists of value SC. The priority function, PVC(K) [n], performs the same comparison as the comparison function in the input controllers. This function results in a true output if the VC contents are not empty and have precedence over the pending priority input. The result is false if the entry is empty or the current contents have less or equal precedence than the pending priority input.

The above description uses SC as the input value to priority function PVC(K)[n] for implementing fairness in the arbitration sessions. It is to be appreciated, however, that other types of priority input values can be used to describe other priority attributes that are to be compared.

We will now look at a situation where k=2. It is assumed there are two ports of interest, input port 1 and input port 3.

Data of input port 1 has entered the logic unit 13 and has been loaded in a K=1 table of VC, (i.e. a high priority table) and simultaneously to the crossbar associated with the K=1 table. Next, data of a lower priority input port 3 which is requesting the same output destination as input port 1, is entered. Input port 3 will read out the high priority table (i.e. K=1), and find that an entry already exists. In a comparison operation within logic unit 13 it is determined input port 3 is lower priority than what is in the high priority table. The lower priority table (i.e. K=2 table of VC) is then investigated and found to be empty. Based on this, input port 3 loads the low priority table (K=2) with its information and simultaneously loads the crossbar associated with the lower priority table.

If on the other hand, input port 3 had entered the logic unit at a higher priority than input port 1, the entry from input port 1 in the higher priority table would be moved to the lower priority table. However, if this were the only action taken, a problem would exist since, while it is fairly straight forward to exchange information between the higher and lower priority tables which are inside of the logic unit, to move data from one crossbar array to another is complex and unwieldy. So it is useful to provide a configuration where movement between crossbars is not required. To accomplish this, table V is configured to hold information identifying the crossbar that was loaded for a particular VC.

Therefore, if there are input port requests in the high priority (K=1) and low priority (K=2) tables each requesting the same destination and, therefore, written to two different crossbars and a third request comes in which is a higher priority than either existing entries, the data associated with the lower priority is removed either because the lower priority table data is overwritten or there is a shifting down from the higher priority to the lower priority.

Since each priority table, VC, entry has a V table entry which contains information identifying the crossbar that is loaded, e.g. that crossbar associated with the lowest priority entry, when the lowest priority entry is removed the new entry will take the crossbar identifier associated with the removed entry and reload it. A table entry is then made which associates the new entry whether in the high priority table or the low priority table.

By the above arrangement it is necessary to only load one crossbar per cycle. A mapping of which crossbar is being loaded is necessary to keep track of which crossbars the entries in the high priority and low priority tables are associated.

When both the high priority table and the low priority table are filled and another request is made which is higher than both existing requests, a load of the high priority table will be made, and what is in the high priority table will be moved down to the lower priority table. In the process, there is no change from where the crossbar was loaded to the entry that has been moved down to the lower priority table. The mapping between the crossbar and the entry still exists. What occurred was a movement among internal tables in order to maintain the ordering of precedence so as to keep track of the crossbar in which the data is located. However, crossbar information was not moved. It is to be appreciated from the above that the crossbars are not of a high and low priority and may be loaded in an arbitrary priority fashion.

The above example is implemented with logic unit 13 using the algorithm shown in FIG. 12. The algorithm provides the parameters of the crossbar banks and input ports, sets the tables VC and V, and describes the variables 1, p (i.e., this context p is equivalent to SC), SA, and To The variables SA, SC and T are noted as being obtained from the reservation ring from signals of the same name. A detailed discussion of SA, SC and T has been set forth in preceding sections of this application.

It is noted that the algorithm of FIG. 12 works simultaneously on all the columns of the tables. Particularly, for example, the right-hand side of all the assignments in the tables are being evaluated before being assigned to the left-hand side. Therefore, all tables are being worked on by evaluating all the right-hand side of the assignments with older information and simultaneously updating the tables.

We will now discuss operation of the invention with particular attention to the algorithm in FIG. 12, where k=5 crossbars and the priority function works on numbers 1–10 with highest priority being 10. It is then assumed that inputs with priorities 5, 4, 2 and 1 are currently in the crossbar and in the tables. In other words, table K=0 has a priority of 5 and table K=1 has a priority of 4, table K=2 has a priority of 2 and table K=3 has a priority of 1. Then further assuming the next input request has a priority value of 3, execution of the algorithm for K=1 finds that the first condition PVC(K−1)[SA] is true and that ~PVC(K)[SA] is not true. Therefore, the algorithm will "fall through" to the next "if" statement, ~PVC(K−1)[SA] which is also not true. This means the algorithm "falls through" to the "do nothing" instruction. Similarly, for table K=1 the algorithm operation also "falls through" to the "do nothing" instruction for reasons similar to K=0.

When table K=2 is investigated for the request having a priority of 3 it is found that PVC(K−1) [SA] is true and that ~PVC(K) [SA] is also true since 3 is logically between numeral 4 and numeral 2. This means the first clause associated with this statement will be executed.

The first clause loads the crossbar fabric. To accomplish this it is necessary to determine which particular crossbar array is going to be loaded by looking at the V table. The algorithm investigates the lowest priority column in the V table and selects the crossbar entry to be reloaded, i.e. the entry that is going to be moved down to the lower priority table.

The V table is set so there is a unique entry in all of the tables. Therefore, even if there is no entry in the lowest priority table it is in a sense bumping or moving down an empty entry, but it is still a valid value of the crossbar. The entry that is being bumped is being selected and this position is then loaded with the appropriate information. Particularly, it is loaded with the information associated with the input request having a priority of 3. The algorithm of FIG. 12 then updates the appropriate tables of logic unit 13.

What is occurring is that V(K) which is the crossbar that is being loaded is selecting the value that was bumped. In other words, K=1 is the lowest order. VC(K) puts the current priority, i.e. priority 3 into the table for future comparisons. The entry in K=2 has thus been reloaded. The algorithm has, therefore, reloaded the crossbar, reloaded VC and V. What was in the K=2 column has been removed from K=2. However, simultaneously with this operation that data has been copied to K=3. In essence, what was in the K=2 table is bumped down to the K=3 table. The algorithm is shifting the entry one table down to the next table for every priority lower than the one which was inserted.

The first "if" statement, therefore, is a statement which provides for the insertion of the additional or new data, the second "if" statement provides for the moving down through the tables and the third "if" statement, which is a "do nothing" statement, addresses the situation where the requests with priorities already existing in the tables are higher than the incoming priority and what is already in the tables is not to be altered.

The invention has been described with reference to the preferred embodiments. Obviously modifications and alterations will occur to others upon the reading and understanding of this specification. It is intended that all such modifications and alternations are included insofar as they come within the scope of the appended claims or the equivalents thereof.

Having thus described the invention, we claim:

1. A switching fabric system for routing data packets in an ATM switch comprising:

a logic unit operatively connected to a reservation ring of the ATM switch, the logic unit intercepting from the reservation ring input port routing requests for routing associated data packets to selected output ports; and a non-self-routing crossbar array arranged to receive output from the logic unit, the output used to set-up paths in the non-self-routing crossbar array for routing the associated data packets of the requesting input ports.

2. The system according to claim 1 wherein the reservation ring includes a plurality of evaluators, the evaluators configured to rotate data through the reservation ring, the rotated data being passed back through the reservation ring after passing through a predetermined evaluator.

3. The system according to claim 2 wherein the logic unit is operatively connected to the predetermined evaluator of the reservation ring, to intercept the data coming out of the predetermined evaluator, prior to the data passing back through the reservation ring.

4. The system according to claim 3 wherein the predetermined evaluator is a bottom evaluator of the reservation ring, said logic unit thereby operatively connected at the bottom of the reservation ring.

5. The system according to claim 1 wherein the non-self-routing crossbar switching fabric includes a plurality of non-self-routing crossbar arrays.

6. The system according to claim 5 wherein the logic unit includes a priority table for maintaining priority information, a crossbar table for maintaining information of the non-self-routing crossbar arrays associated with an input port, and a comparator.

7. The system according to claim 5 wherein the logic unit includes a plurality of priority tables prioritized from a highest priority to a lowest priority.

8. A method of routing data packets in an ATM switch, the method comprising:

intercepting from a reservation ring of the ATM switch, by a logic unit, input port routing requests for routing associated data packets to selected output ports;

processing, in the logic unit, the intercepted input port routing requests, to generate path set-up information; and supplying the path set-up information to a non-self-routing crossbar fabric to set-up paths for routing the data packets of the requesting input ports.

9. The method according to claim 8 wherein the path set-up information is supplied to the non-self-routing crossbar fabric on each clock cycle, whereby a pipeline delay in supplying the non-self-routing crossbar fabric is avoided.

10. The method according to claim 8 wherein the path set-up information is stored in an internal table of the logic unit, and at an end of an arbitration cycle the path set-up information stored in the internal table is supplied to the non-self-routing crossbar fabric.

11. The method according to claim 8 wherein the step of processing includes reading an internal table of the logic unit to determine if the requesting input port which is requesting an output port should be provided access to the requested output port.

12. The method according to claim 11 wherein states of requests from the requesting input port are copied into the non-self-routing crossbar fabric at the same time they are copied into the tables of the logic unit, whereby recopying of the data sent to the non-self-routing crossbar fabric is not required.

13. The method according to claim 8 further including configuring the non-self-routing crossbar fabric to consist of a plurality of non-self-routing crossbar arrays and a plurality of tables.

14. The method according to claim 13 wherein the step of processing includes reading the plurality of tables to determine whether the requesting input port has a priority greater or less than an input port whose previous request is stored in one of the plurality of tables; and rewriting at least one of the plurality of tables when it is determined the requesting input port has a priority greater than a request stored in one of the plurality of tables, wherein the stored request is from an input port having a lower priority.

15. The method according to claim 14 wherein the tables are prioritized from a highest priority to a lowest priority.

16. The method according to claim 15, wherein said rewriting step further includes writing the request from the requesting input port having a priority greater than the request stored in said one of the plurality of tables, in place of the request from the input port having a lower priority; and writing the request from the input port having the lower priority to a table having a priority lower than the table to which the request from the input port having the higher priority is written.

17. The method according to claim 13 wherein only input to output mapping information is stored in the non-self-routing crossbar arrays.

18. The method according to claim 13 wherein the step of processing includes reading the plurality of tables to determine whether the requesting input port has a priority greater or less than an input port whose previous request is stored in one of the plurality of tables;

determining the requesting input port has a priority less than the input port whose request is stored; and, storing a request from the lower requesting input port at a location in one of the tables different from that of the stored request.

19. The method according to claim 8 wherein the step of supplying includes having the logic unit loading the non-self-routing crossbar fabric simultaneously as the data from the reservation ring is shifted out of the reservation ring.

20. A switching fabric system in an ATM switch comprising:

a reservation ring including a plurality of evaluators each evaluator including (i) a one bit valid register, which holds an indication of whether the associated evaluator won or lost/was inactive in an arbitration cycle, (ii) a Z register, which contains one of a variable Cntr or a stopper ID indicating a crossbar which is to be written to, and (iii) an OutputPort register which contains an address of an output port to which an input port associated with the evaluator has won access;

the Valid register for each of the evaluators tied together in a shift register;

the Z bit register for each of the evaluators tied together in a shift register;

the OutputPort register for each of the evaluators tied together in a shift register; and a logic unit connected to intercept data from each of the Valid shift register, the Z shift register, and the OutputPort shift register, the logic unit using the received data to generate crossbar set-up data, whereby during a next arbitration session results of a previous arbitration session are shifted from the logic unit to a connected non-self-routing crossbar fabric to thereby set-up the non-self-routing crossbar fabric for routing of data packets therethrough.

* * * * *